(12) United States Patent
Bandholz et al.

(10) Patent No.: US 8,244,793 B2
(45) Date of Patent: *Aug. 14, 2012

(54) RESETTING A HYPERTRANSPORT LINK IN A BLADE SERVER

(75) Inventors: Justin P. Bandholz, Cary, NC (US); Andrew S. Heinzmann, Apex, NC (US); James J. Parsonese, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1319 days.

This patent is subject to a terminal disclaimer.

(21) Appl. No.: 11/748,177

(22) Filed: May 14, 2007

(65) Prior Publication Data

US 2008/0288679 A1 Nov. 20, 2008

(51) Int. Cl.
*G06F 15/177* (2006.01)
(52) U.S. Cl. ........ 709/200; 709/221; 710/100; 710/107; 710/305; 710/316
(58) Field of Classification Search .................. 709/220, 709/221; 710/100, 107, 305, 316
See application file for complete search history.

(56) References Cited

U.S. PATENT DOCUMENTS

| | | | |
|---|---|---|---|
| 7,146,510 B1 * | 12/2006 | Helms et al. ................... | 713/300 |
| 7,254,115 B1 * | 8/2007 | Lakhanpal et al. ........... | 370/257 |
| 7,350,090 B2 * | 3/2008 | Baurer et al. ................. | 713/300 |
| 7,359,994 B1 | 4/2008 | Lakhanpal et al. | |
| 7,398,380 B1 | 7/2008 | Lovett et al. | |
| 7,490,187 B2 | 2/2009 | Moll et al. | |
| 7,577,727 B2 * | 8/2009 | Kota et al. ..................... | 709/221 |
| 7,620,057 B1 | 11/2009 | Aloni et al. | |
| 7,630,304 B2 | 12/2009 | Larson et al. | |
| 7,657,677 B2 * | 2/2010 | Huang et al. .................. | 710/100 |
| 7,698,483 B2 * | 4/2010 | Pettey et al. ..................... | 710/62 |
| 2004/0130347 A1 * | 7/2004 | Moll et al. ....................... | 326/62 |
| 2004/0207440 A1 | 10/2004 | Robertson et al. | |
| 2005/0021699 A1 * | 1/2005 | Kota et al. ..................... | 709/221 |
| 2005/0066106 A1 | 3/2005 | Lee | |
| 2005/0235083 A1 | 10/2005 | Tsushima et al. | |
| 2005/0257654 A1 * | 11/2005 | Huang ............................ | 83/358 |
| 2006/0104289 A1 | 5/2006 | Lee | |

(Continued)

OTHER PUBLICATIONS

AMD, "HyperTransport Technology I/O Link," Jul. 20, 2001, http://www.datasheetarchive.com/pdf/Datasheet-021/DSA00367992.pdf.*

(Continued)

*Primary Examiner* — Dohm Chankong
(74) *Attorney, Agent, or Firm* — Brandon C. Kennedy; Cynthia G. Seal; Biggers & Ohanian, LLP.

(57) ABSTRACT

Methods, apparatus, and computer program products are described for resetting a HyperTransport link in a blade server, including reassigning, by a blade management module, a gate signal from enabling a transceiver to signaling a HyperTransport link reset; sending, by the blade management module to a reset sync module on an out-of-band bus, the gate signal; and in response to the gate signal, sending, by the reset sync module to the blade processor, HyperTransport reset signals. The HyperTransport link includes a bidirectional, serial/parallel, high-bandwidth, low-latency, point to point data communications link. The blade server includes the blade processor, the reset sync module, and the baseboard management controller. The blade server is installed in the blade center. The blade center includes the blade management module. The blade management module is coupled to the baseboard management controller by the blade communication bus.

18 Claims, 5 Drawing Sheets

U.S. PATENT DOCUMENTS

| | | |
|---|---|---|
| 2006/0140211 A1* | 6/2006 | Huang et al. .................. 370/466 |
| 2007/0079046 A1 | 4/2007 | Yang et al. |
| 2007/0083774 A1 | 4/2007 | Baurer et al. |
| 2007/0169088 A1 | 7/2007 | Lambert et al. |
| 2007/0220301 A1* | 9/2007 | Brundridge et al. .............. 714/4 |
| 2007/0274231 A1 | 11/2007 | Marks et al. |
| 2008/0098354 A1* | 4/2008 | Chen et al. .................... 717/120 |
| 2008/0147924 A1 | 6/2008 | Lambert et al. |
| 2008/0259555 A1 | 10/2008 | Bechtolsheim et al. |
| 2008/0288626 A1 | 11/2008 | Bandholz et al. |
| 2009/0138580 A1 | 5/2009 | Takamoto et al. |
| 2009/0138749 A1 | 5/2009 | Moll et al. |

OTHER PUBLICATIONS

Office Action Dated Mar. 3, 2010 in U.S. Appl. No. 12/167,456.

* cited by examiner

RESETTING A HYPERTRANSPORT LINK IN A BLADE SERVER

BACKGROUND OF THE INVENTION

1. Field of the Invention

The field of the invention is data processing, or, more specifically, methods, apparatus, and products for resetting a HyperTransport link in a blade server.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which substantial technical advances have been achieved is in resetting HyperTransport links in blade servers. In blade servers that employ HyperTransport technology, a set of shared reset signals are required to be asserted to each blade server in as little as 100 nanoseconds of each other to reset a HyperTransport link and guarantee proper HyperTransport operation. In current art, there exists no defined facility in a blade center to allow for synchronization of the reset signals across multiple blade servers in the blade center.

SUMMARY OF THE INVENTION

Methods, apparatus, and computer program products are described for resetting a HyperTransport link in a blade server, including reassigning, by a blade management module, a gate signal from enabling a transceiver to signaling a HyperTransport link reset; sending, by the blade management module to a reset sync module on an out-of-band bus, the gate signal; and in response to the gate signal, sending, by the reset sync module to the blade processor, HyperTransport reset signals. The HyperTransport link includes a bidirectional, serial/parallel, high-bandwidth, low-latency, point to point data communications link. The blade server includes the blade processor, the reset sync module, and the baseboard management controller. The blade server is installed in the blade center. The blade center includes the blade management module. The blade management module is coupled to the baseboard management controller by the blade communication bus.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
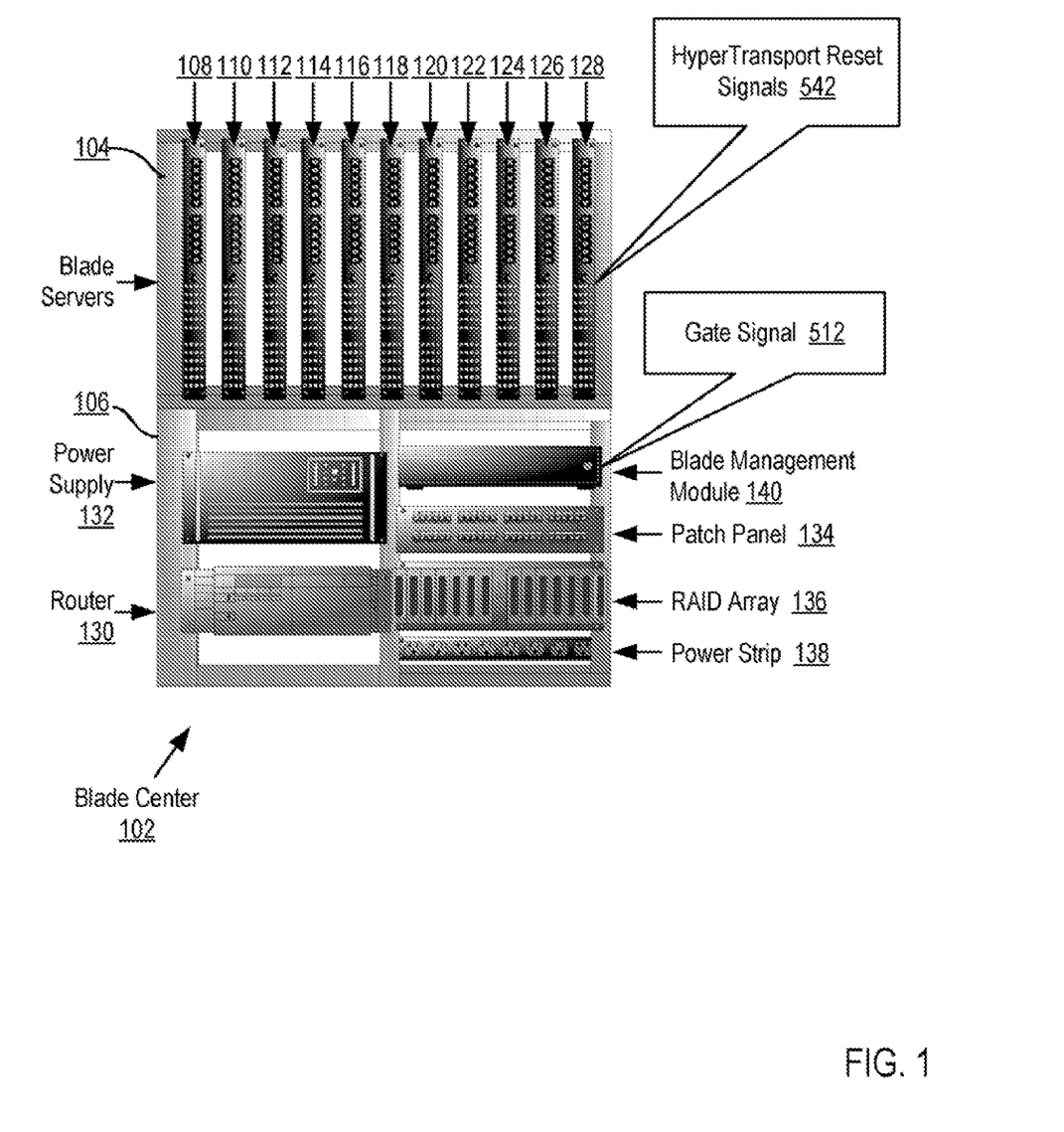
FIG. 1 sets forth a front view of an exemplary blade center that is configured for resetting a HyperTransport link in a blade server according to embodiments of the present invention.

Exemplary methods, systems, and products for resetting a HyperTransport™ link in a blade server according to embodiments of the present invention are described with reference to the accompanying drawings, beginning with FIG. 1. FIG. 1 sets forth a front view of an exemplary blade center (102) that is configured for resetting a HyperTransport link in a blade server according to embodiments of the present invention. The system of FIG. 1 includes eleven blade servers (108-128) implemented in blade form factor and installed in a cabinet bay (104) of a blade center (102). Each blade server includes a reset sync module, a baseboard management controller and a blade processor that employs HyperTransport technology. The reset sync module may be a state machine implemented using a programmable logic device, a programmable logic controller, logic gates and flip flops, relays and the like, or the reset sync module may be a module of computer program instructions that cause the baseboard management controller in the blade server to send HyperTransport reset signals to the blade processor. A baseboard management controller is a specialized microcontroller embedded on the motherboard of many computers, especially blade servers. The baseboard management controller is the intelligence in the Intelligent Platform Management Interface ('IPMI') architecture. The baseboard management controller manages the interface between system management software and platform hardware.

The blade processors of the exemplary blade servers (108-128) of FIG. 1 are coupled for data communications by HyperTransport links. A HyperTransport Link is a bidirectional, serial/parallel, high-bandwidth, low-latency, point to point data communications link. HyperTransport technology is used in a number of different applications including, for example:

Replacing the front-side bus in computer systems, effectively eliminating multiple communication adapters in a system. A computer implemented with HyperTransport technology instead of a front-side bus with multiple communication adapters is faster and more flexible. The NVIDIA nForce™ chipset, for example, uses HyperTransport technology to connect its north and south bridges.

Multiprocessor interconnect applications. Hypertransport technology is used in Direct Connect Architectures to enable Non-Uniform Memory Access or Symmetric multiprocessing. For example, The Direct Connect Architecture is the I/O architecture of the Athlon64™ and Opteron™ microprocessors from AMD™.

Replacing Router or Switch Bus. HyperTransport technology can be used as a bus in routers and switches. Routers and switches have multiple connections ports and data has to be forwarded between these ports as fast as possible. HyperTransport greatly exceeds the bandwidth needed for this application.

HyperTransport eXpansion and Co-processor interconnect. Using the same mechanical connector as a 16-lane PCI-Express slot, plus an x1 connector for power pins, HTX allows plug-in cards to be developed which support direct access to a CPU and Direct Memory Access to the system RAM.

Others as will occur to those of skill in the art.

A HyperTransport link in a blade server may require a reset to synchronize communications on the link between other blade servers. Such a reset may be initiated, for example, because the blade server is fully powering on, the blade server is transitioning from a sleep or hibernate state to a fully powered state, the system connected by the HyperTransport link to the blade server is fully powering on or is transitioning from a sleep or hibernate state, or other reasons as will occur to those of skill in the art. There are two primary types of resets of a HyperTransport link, a warm reset and cold reset. A cold reset is a reset of a HyperTransport link that occurs during the power on sequence of a processor. A warm reset is a reset of a HyperTransport link that occurs after power is already on and may be initiated through a software routine, through hardware, or both. A warm rest may be used when the entire system does not necessarily need to be reinitialized, such as for example, when transitioning from a sleep state to a fully powered state. To effect either type of reset a set of HyperTransport reset signals (542) are used. The HyperTransport reset signals include:

PWROK, a single-ended signal that represents the stability of the power and clock signals;

RESET #, a single ended signal that represents a reset of the HyperTransport Technology;

LDTSTOP#; a single-ended signal, used in systems requiring power management, that enables and disables links during system state transitions; and others useful for resetting a HyperTransport link in a blade server as will occur to those of skill in the art.

According to the HyperTransport I/O Link Specification, Rev. 1.03, to effect a cold reset of a HyperTransport link in a blade processor, two signals are asserted at the processor, PWROK and RESET#. PWROK is asserted at least 1 millisecond after the power and clock sources for all HyperTransport technology devices have become stable. RESET# must be asserted 1 millisecond before PWROK is asserted and RESET# must remain asserted for at least 1 millisecond beyond the assertion of PWROK. To effect a warm reset of a HyperTransport link in a processor of a blade server three signals are asserted at the processor, PWROK, RESET# and LDTSTOP#. RESET# must be asserted for at least 1 millisecond. LDTSTOP# must be deasserted at least 1 microsecond before RESET# is deasserted, and it must remain deasserted until the link has completed a synchronization sequence.

The exemplary blade center (102) of FIG. 1 includes a blade management module (104), installed in cabinet bay (106), that resets a HyperTransport link in a blade server by reassigning a gate signal (512) from its usual duty of enabling a transceiver to a new duty of signaling a HyperTransport link reset and sending the gate signal to a reset sync module in the blade server on an out-of-band bus. The blade management module (140) of FIG. 1 is a hot-swappable device that can be used by a system administrator to configure and manage all components installed in the blade center (102). The gate signal (512) is a continuous electrical signal capable of producing a high logic level, logic 1, and low logic level, logic 0. The logic level of the gate signal is normally used to enable or disable the operations of a transceiver on a blade server. The transceiver provides communications between the blade management module and the baseboard management controller through a blade communications bus. One such transceiver is, for example, an RS-485 transceiver. An RS-485 transceiver may be used in a blade server, for example, to transmit and receive signals on an RS-485 bus between the blade server and the blade management module. In systems that reset HyperTransport links according to embodiments of the present invention, however, the normal gating duty of the gate signal (512) is reassigned so that the gate signal is used to signal a HyperTransport reset to a reset sync module in a blade server. The gate signal is provided to the reset sync module through an out-of-band bus, and the baseboard management controller that normally uses the blade communications bus is advised to temporarily cease use of the blade communications bus. The gate signal, when presented on the out-of-band bus to the reset sync module, will still gate the transceiver, but such gating of the transceiver will have no effect on the communications through the blade communications bus because the baseboard management controller will be sending no signals through the transceiver. When the reset sync module of the blade server receives the gate signal (512), the reset sync module sends HyperTransport reset signals to the to the blade processor.

In the exemplary blade center (102) of FIG. 1 the cabinet bay (106) includes, in addition to the blade management module (140), a power supply (132) that provides power to all components of the blade center (102), a data communications network router (130), a patch panel (134), a Redundant Array of Independent Disks ('RAID') (136), and a power strip (138). In the system of FIG. 1, the power supply (132) and the blade management module (140) are housed in cabinet bays for purposes of clarity. Those of skill in the art will recognize, however, that the power supply and blade management module (140) may be embedded as part of the blade center (102) or be implemented in a system external to the blade center (102).

The arrangement of blade servers, power supply, RAID array, power strip, and other devices making up the exemplary blade center illustrated in FIG. 1 are for explanation, not for limitation. Blade centers useful according to various embodiments of the present invention may include additional servers, routers, or other devices, not shown in FIG. 1, as will occur to those of skill in the art. Various embodiments of the present invention may be implemented on a variety of hardware platforms in addition to those illustrated in FIG. 1.

Resetting a HyperTransport link in a blade server in accordance with the present invention is generally implemented with computers, that is, with automated computing machinery. In the system of FIG. 1, for example, all the blade servers, the management module, and the communications devices are implemented to some extent at least as computers. For further explanation, therefore, FIG. 2 sets forth a block diagram of automated computing machinery comprising an exemplary blade management module (140) useful in resetting a HyperTransport link in a blade server according to embodiments of the present invention. The blade management module (140) of FIG. 2 includes at least one computer processor (157) or 'CPU' as well as random access memory (168) ('RAM') which is connected through a high speed memory bus (166) and bus adapter (158) to the processor (157) and to other components of the computer.

Figure 2:
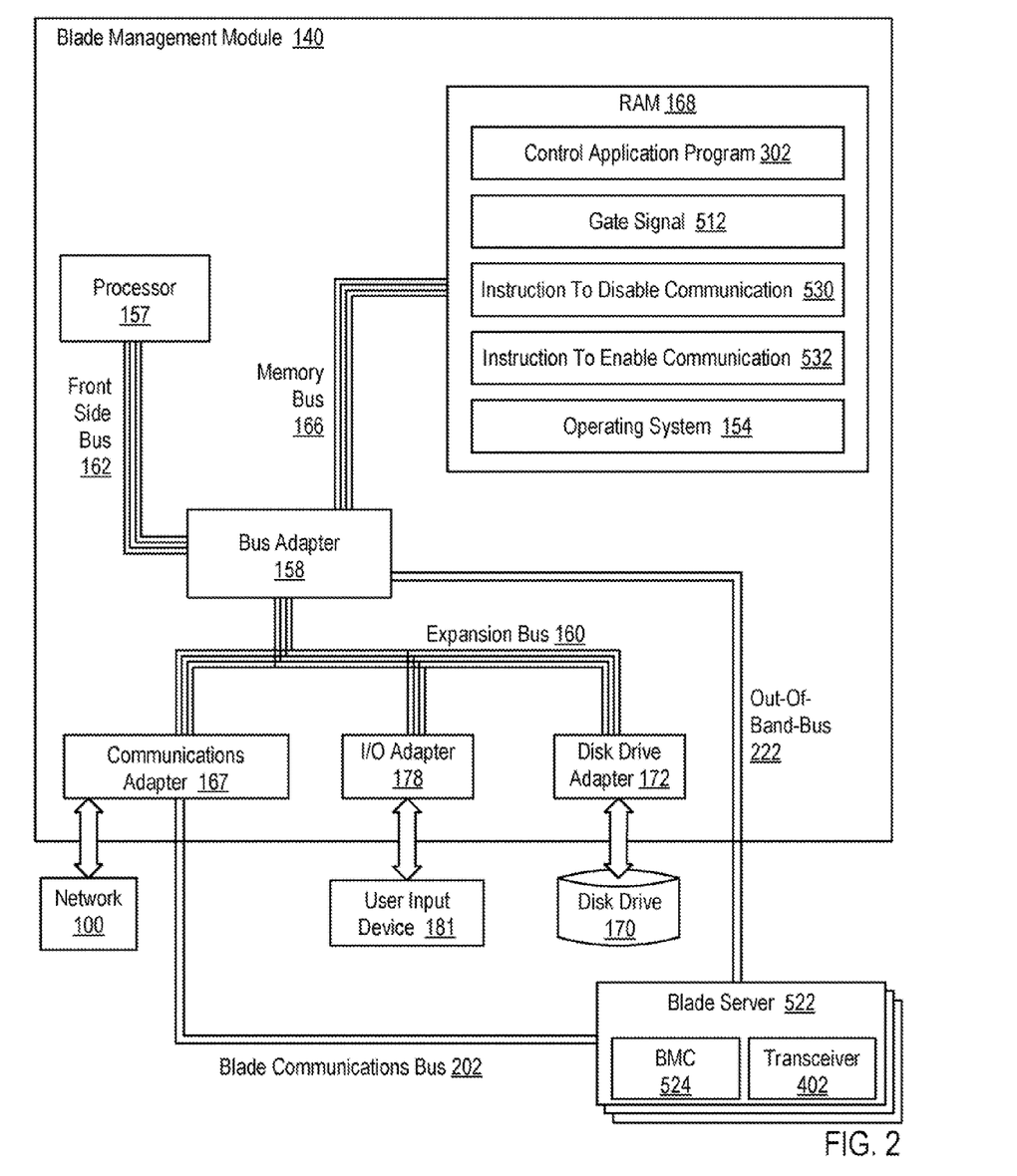
FIG. 2 sets forth a block diagram of automated computing machinery comprising an exemplary blade management module useful in resetting a HyperTransport link in a blade server according to embodiments of the present invention.

Stored in RAM (168) is a control application program (302), a module of computer program instructions that cause the automated computing machinery in the example of FIG. 2 to reset a HyperTransport link in a blade server by reassigning, by the blade management module (140), a gate signal (512) from enabling a transceiver to signaling a HyperTransport link reset. The gate signal (512) is typically sent by the blade management module (140) to the blade server (522) on the out-of-band bus (222). The out-of-band bus (222) is a communications link for out-of-band communications of data and instructions between the baseboard management controller in the blade server and the blade management module (140). Types of communications links useful for such out-of-band communications include:

- The System Management Bus ('SMBus'), a two-wire bus used for communication with low-bandwidth devices on a motherboard, especially power related chips such as a laptop's rechargeable battery subsystem, temperature sensors, and lid switches.
- I²C bus, a serial computer bus invented by Philips that is used to for low-speed communications with peripheral components of a system. The name stands for Inter-Integrated Circuit and is pronounced I-squared-C or sometimes as I-two-C.
- The Universal Serial Bus ('USB'), a serial bus standard for communications designed to allow a peripheral to be connected without an expansion cards, and to improve plug-and-play capabilities by allowing devices to be hot-swapped. Originally designed for computers, its flexibility has placed USB buses on video game consoles, PDAs, portable DVD and media players, cellphones, and even devices such as televisions, home stereo equipment, digital audio players, car stereos, and portable memory devices.
- Inifiniband link, a point-to-point, bidirectional serial link intended for the connection of processors with high speed peripherals such as storage devices. InfiniBand is the result of merging two competing designs, Future I/O, developed by Compaq, IBM, and Hewlett-Packard, with Next Generation I/O (NGIO), developed by Intel, Microsoft, and Sun. From the Compaq side, the roots were derived from Tandem's ServerNet. For a short time before the group came up with a new name, InfiniBand was called System I/O.
- Others as will occur to those of skill in the art.

The blade management module (140) may reassign the gate signal (512) from enabling a transceiver to signaling a HyperTransport link reset by sending to a baseboard management controller (524) of a blade server (522), an instruction (530) to disable communication on the blade communication bus (202) between the blade management module (140) and the baseboard management controller (524). The gate signal (512), when presented on the out-of-band bus to the reset sync module, will still gate the transceiver, but such gating of the transceiver will have no effect on the communications through the blade communications bus because the baseboard management controller will be sending no signals through the transceiver.

In the exemplary blade management module (140) of FIG. 2, the blade communication bus (202) can be any type of data communications link such as, for example:

- An RS-485 bus, a differential signal, two-wire, half-duplex, multipoint serial connection. The RS-485 communication link is used for many different applications including implementing low-speed data communications in commercial aircraft cabins, programmable logic controllers, implementing proprietary data communications on factory floors, large sound systems as found at music events and theatre productions, remotely controlling high-end sound-processing equipment from a standard computer running special software, building automation as the bus configuration and long cable length is ideal for joining remote devices, and control of theatrical and disco lighting.
- A PCI Express bus, a bus that allows expansion cards with various capabilities to be added to a system. While PCI Express has the same software interface as PCI and can be bridged to PCI, the cards are physically and electrically incompatible.
- A Universal Serial Bus ('USB'), a serial bus standard for communications designed to allow a peripheral to be connected without an expansion cards, and to improve plug-and-play capabilities by allowing devices to be hot-swapped. Originally designed for computers, its flexibility has placed USB buses on video game consoles, PDAs, portable DVD and media players, cellphones, and even devices such as televisions, home stereo equipment, digital audio players, car stereos, and portable memory devices.
- An Inifiniband link, a point-to-point, bidirectional serial link intended for the connection of processors with high speed peripherals such as storage devices. InfiniBand is the result of merging two competing designs, Future I/O, developed by Compaq, IBM, and Hewlett-Packard, with Next Generation I/O (NGIO), developed by Intel, Microsoft, and Sun. From the Compaq side, the roots were derived from Tandem's ServerNet. For a short time before the group came up with a new name, InfiniBand was called System I/O.
- Others as will occur to those of skill in the art.

When communication between the baseboard management controller in the blade server (522) and the blade management module (140) on the blade communication bus (202) has been disabled, the blade management module (140) sends the gate signal (512) to a reset sync module in the blade server (522) on the out-of-band bus (222). The reset sync module then sends HyperTransport reset signals (542) to the blade processor (156). That is, instead of sending the gate signal (512) to enable the transceiver (402) in the blade server, the blade management module sends the gate signal (512) to the rest sync module to signal a HyperTransport link reset. At a time after sending the gate signal (512), the blade management module (140) sends, to the baseboard management controller of the blade server (522), an instruction to enable communication on the blade communication bus between the blade management module (140) and baseboard management controller (524). The blade management module (140) sends the instruction (532) to enable communications on the out-of-band bus (222) because communication on the blade communication bus between the baseboard management controller on the blade server (522) and the blade management module (140) is disabled.

Also stored in RAM (168) is an operating system (154). Operating systems useful in blade management modules according to embodiments of the present invention include UNIX™, Linux™, Microsoft XP™, Microsoft Vista™, AIX™, IBM's i5/OS™, and others as will occur to those of skill in the art. Operating system (154), control application program (302), gate signal (512), the instruction to disable communication (530), and the instruction to enable communication (532) in the example of FIG. 2 are shown in RAM (168), but many components of such software typically are stored in non-volatile memory (166) also for example, on a disk drive (170).

The blade management module (140) of FIG. 2 includes a bus adapter (158), a computer hardware component that contains drive electronics for the high speed buses, the front side bus (162) and the memory bus (166), as well as drive electronics for the slower expansion bus (160). Examples of bus adapters useful in blade management modules according to embodiments of the present invention include the Intel Northbridge, the Intel Memory Controller Hub, the Intel Southbridge, and the Intel I/O Controller Hub. Examples of expansion buses useful in blade management modules according to embodiments of the present invention include Industry Standard Architecture ('ISA') buses and Peripheral Component Interconnect ('PCI') buses.

The blade management module (140) of FIG. 2 includes disk drive adapter (172) coupled through expansion bus (160) and bus adapter (158) to processor (156) and other components of the computer (152). Disk drive adapter (172) connects non-volatile data storage to the blade management module (140) in the form of disk drive (170). Disk drive adapters useful in blade management modules include Integrated Drive Electronics ('IDE') adapters, Small Computer System Interface ('SCSI') adapters, and others as will occur to those of skill in the art. In addition, non-volatile computer memory may be implemented for a blade management module as an optical disk drive, electrically erasable programmable read-only memory (so-called 'EEPROM' or 'Flash' memory), RAM drives, and so on, as will occur to those of skill in the art.

The example blade management module (140) of FIG. 2 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The exemplary blade management module (140) of FIG. 2 includes a communications adapter (167) for data communications with other blade servers (522) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for resetting a HyperTransport link in a blade server according to embodiments of the present invention include modems for wired dial-up communications, Ethernet (IEEE 802.3) adapters for wired data communications network communications, and 802.11 adapters for wireless data communications network communications.

Figure 3:
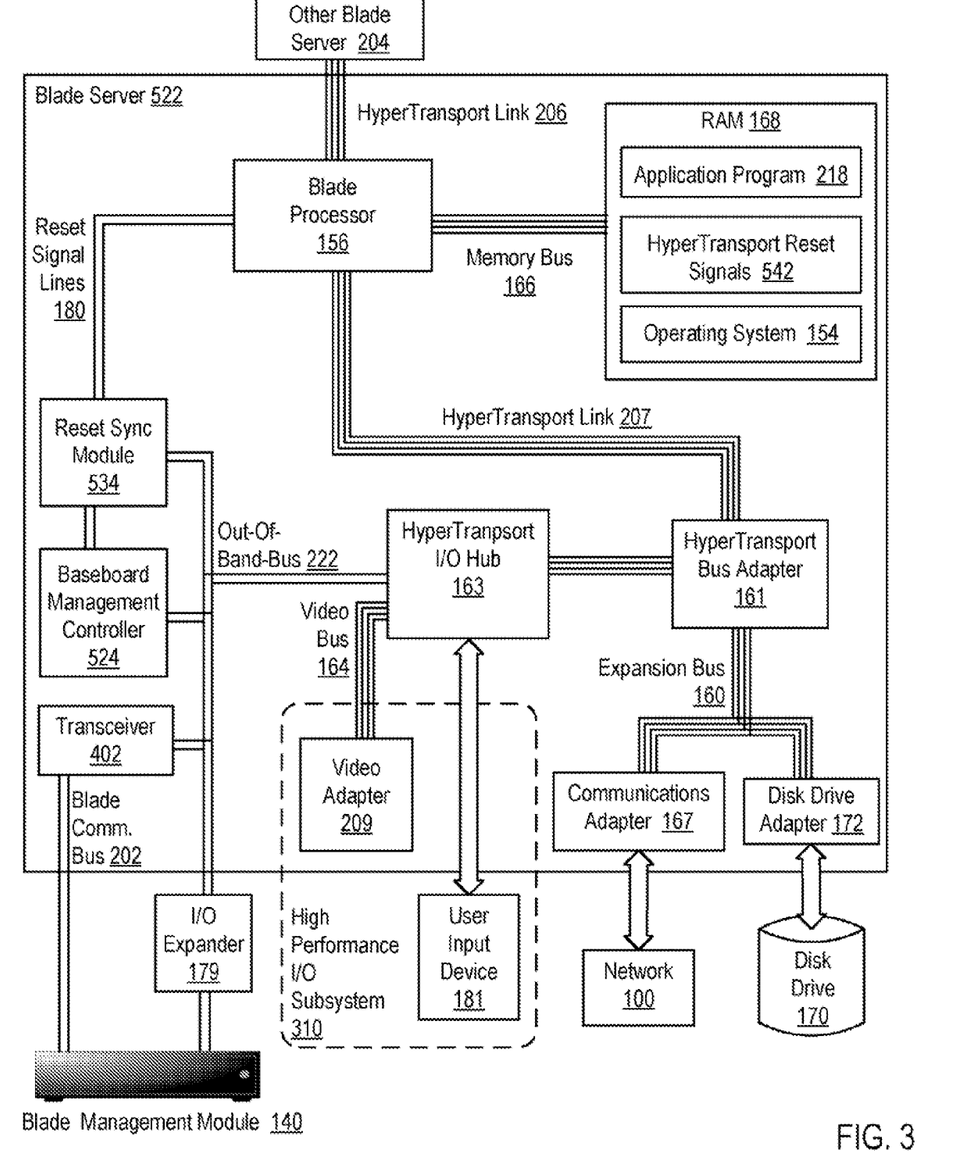
FIG. 3 sets forth a block diagram of automated computing machinery comprising an exemplary blade server configured for resetting a HyperTransport link according to embodiments of the present invention.

For further explanation FIG. 3 sets forth a block diagram of automated computing machinery comprising an exemplary blade server (522) configured for resetting a HyperTransport link according to embodiments of the present invention. The example blade server (522) of FIG. 3 includes several components that are structured and operate similarly as do parallel components of the blade management module (140 on FIG. 2), having the same drawing reference numbers, as described above with reference to FIG. 3: RAM (168), high speed memory bus (166), expansion bus (160), communications adapter (167), disk drive adapter (172), an operating system (154), and so on.

The blade server (522) of FIG. 3 also includes at least one blade processor (156) that employs HyperTransport technology. HyperTransport technology is used by AMD™ and Transmeta™ in x86 processors, PMC-Sierra™, Broadcom™, and Raza Microelectronics™ in MIPS™ microprocessors, AMD™, NVIDIA™, VIA™, SIS™, and HP™ in PC chipsets, HP™, Sun Microsystems™, IBM™, and IWill™ in servers, Cray™, Newisys™, and QLogic™ in high performance computing, Microsoft™ in its Xbox™ game console, and Cisco Systems™ in routers.

The exemplary blade processor (156) of FIG. 3 is directly connected to a high performance I/O subsystem (310) through HyperTransport Link (207), a HyperTransport bus adapter (161), and HyperTransport I/O hub (163). The HyperTransport bus adapter (161) is a HyperTransport tunnel device. A HyperTransport tunnel device connects one HyperTransport technology device to another HyperTransport Technology device. An example of such a HyperTransport tunnel device is the AMD-8131 HyperTransport PCI-x tunnel. The AMD-8131 is a high-speed device that provides two independent, high-performance PCI-X bus bridges, integrated with a high-speed HyperTransport technology tunnel that provides a connection to other downstream HyperTransport technology devices. The I/O Hub is a HyperTransport bridge device a HyperTransport bridge device connect a HyperTransport technology device to device with another type of I/O interconnect standard. The HyperTransport I/O Hub enables communication with user input devices (181) and a video adapter (209) on a video bus (164). A video adapter (209) is an example of an I/O adapter specially designed for graphic output to a display device (180) such as a display screen or computer monitor. The video bus (164) may be any type of data communications bus, for example, a PCI bus. The HyperTransport I/O Hub (163) also connects the reset sync module (534), the baseboard management controller (524), the transceiver (402), and the I/O Expander (179) on the out-of-band bus (222).

In addition to its connection to the high performance I/O subsystem (310), the blade processor (156) of FIG. 3 is also directly connected to a blade processor in another blade server (204) through HyperTransport Link (206) and to random access memory (168) ('RAM') through a high speed memory bus (166). Stored in RAM in the example of FIG. 3 is an application program (218), a module of computer program instructions that causes the blade server (522) in the example of FIG. 3 to reset the HyperTransport link (206). The blade server (522) may reset a HyperTransport link in response to receiving a gate signal on the out-of-band bus (222) from the blade management module (140) by sending, by the reset sync module (534) to the blade processor (156), HyperTransport reset signals (542). The reset sync module may send HyperTransport reset signals (542) over the reset signal lines (180) to the blade processor by setting the HyperTransport reset signals (542) to a logic 1 or logic 0 at the appropriate time in accordance with the type of reset being initiated. In the exemplary blade sever (522) of FIG. 3, the reset sync module is a hardware device for clarity. One of skill in the art will recognize, however, that the reset sync module (534) may alternatively be implemented as a module of computer program instructions, stored in RAM (168), that cause the baseboard management controller (524) to send the HyperTransport reset signals (542) to the blade processor (156).

Although resetting a HyperTransport link has been described here with respect to a single blade server, systems that reset HyperTransport links in blade servers according to embodiments of the present invention in fact often reset each link in a chain of HyperTransport links in support of synchronous communication among two or more blade servers. For further explanation, therefore, FIG. 4 sets forth a functional block diagram of an exemplary blade center (102) that is configured to reset a HyperTransport link (206) that connects at least two blade servers in a HyperTransport chain. Each blade server (522, 523) includes a blade processor (156, 159), a reset sync module (534, 535), and a baseboard management controller (524, 525). The blade server (522) is coupled for data communications to blade server (523) by a HyperTransport link (206), a bidirectional, serial/parallel, high-bandwidth, low-latency, point to point data communications link.

Figure 4:
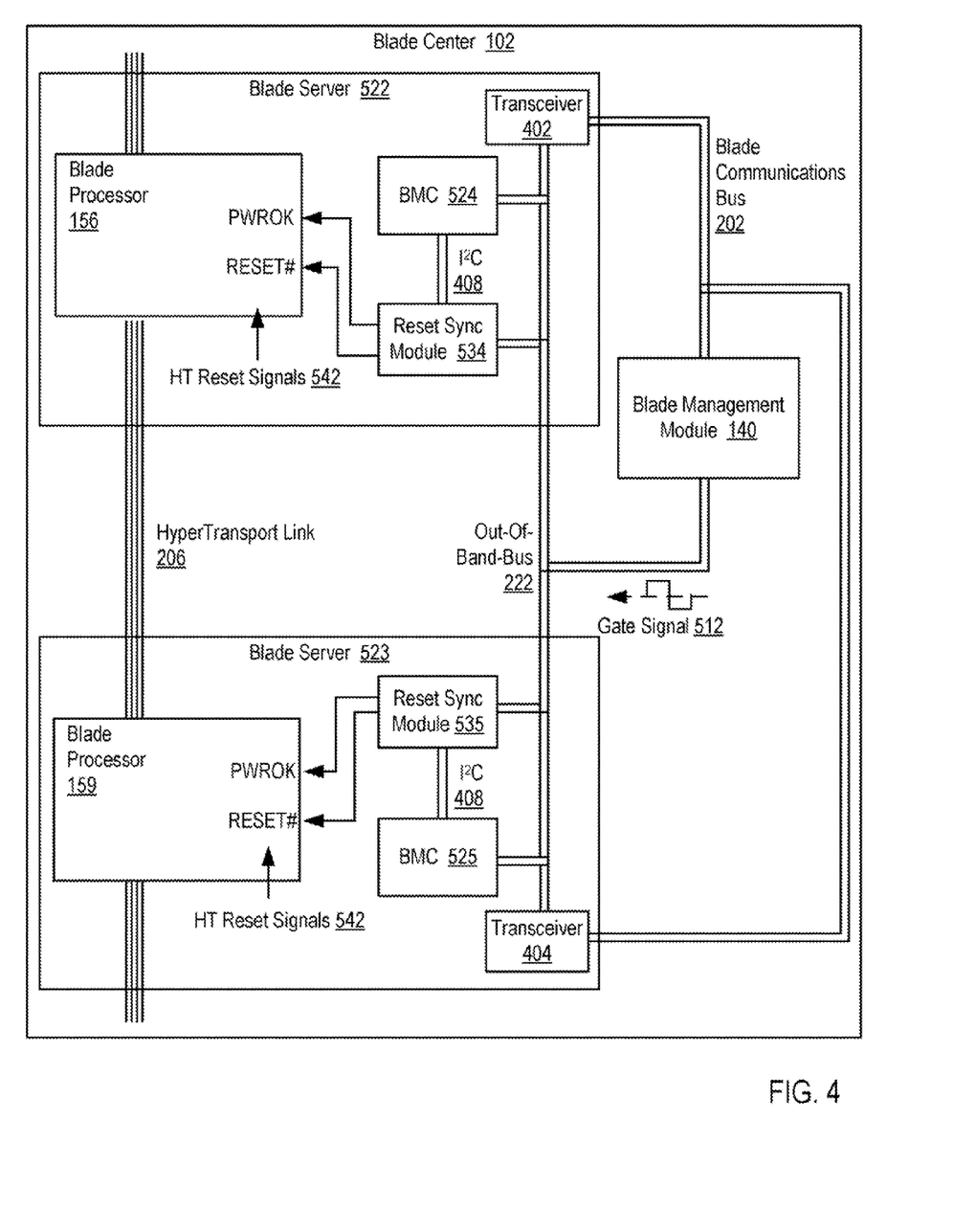
FIG. 4 sets forth a functional block diagram of an exemplary blade center that is configured to reset a HyperTransport link that connects at least two blade servers in a HyperTransport chain.

The exemplary blade center (102) of FIG. 4 includes a blade management module (140). The blade management module (140) is coupled to each baseboard management controller (524, 525) by a blade communication bus (202). The blade communication bus may be any type of data communications link such as, for example an RS-485 bus, a PCI Express bus, A Universal Serial Bus ('USB'), an Inifiniband link, or any other communication link as will occur to those of skill in the art. The exemplary blade management module (140) of FIG. 4 receives a notification that a HyperTransport link (206) requires a reset. The blade management module may receive the notification that HyperTransport link (206) requires a reset from the baseboard management controller of the blade server that requires a HyperTransport link reset or may receive the notification from a remote user that instructs the blade management module directly to perform a reset. That is, the notification may be a signal sent from a baseboard management controller that initiates an interrupt in the blade management module, or the notification may be a software interrupt initiated by a remote user, such as a system administrator—or the notification may be implemented in some other form as will occur to those of skill in the art.

When the blade management module receives the notification that a HyperTransport link requires a reset, the blade management module (140) sends a message advising the baseboard management controllers (524, 525) to initiate a HyperTransport link reset. The message is sent to the baseboard management controllers (524, 525) on the blade communication bus (202). The message advising the baseboard management controllers to initiate a HyperTransport link reset may include an identification of a type of reset to be initiated, such as, for example an identification that the type of reset to be initiated is a warm reset, cold reset, a reset due to a power state transition, and so on.

When the baseboard management controllers (524, 525) receive the message advising the baseboard management controllers to initiate a HyperTransport link reset, the baseboard management controllers (524, 525) arm the reset sync modules (534, 535) to receive a gate signal. The baseboard management controllers (524, 525) arm their respective reset sync modules (534, 535) by sending to the reset sync module an arming event over a bus which in the example of FIG. 4 is an I²C for clarity. One of skill in the art will immediately recognize that the bus (408) may be any bus used for out-of-band communications. The arming event may include the identification of type of reset to be initiated or the HyperTransport signals to be sent by the reset sync module to the blade processor.

In the exemplary blade center (102) of FIG. 4, after the blade management module sends the message advising the baseboard management controllers (524, 525) to initiate a HyperTransport link reset, the blade management module (140) reassigns a gate signal from enabling the transceivers (402, 404) to signaling a HyperTransport link reset. The blade management module (140) reassigns a gate signal from enabling the transceivers (402, 404) to signaling a HyperTransport link reset by sending to a baseboard management controller of a blade server an instruction to disable communications on the blade communication bus (202) between the blade management module (140) and the baseboard management controller.

After the blade management module (140) reassigns the gate signal (512) from enabling the transceivers (402, 404) to signaling a HyperTransport link reset, the blade management module (140) sends to the reset sync modules (534, 535) on the out-of-band bus (222) the gate signal (512). The blade management module sends the gate signal (512) to the reset sync modules (534, 535) by transmitting the gate signal as a pulse. That is, the blade management module (140) inverts the gates signal (512) and then reverts the gate signal (512). At a time after sending the gate signal (512) to the reset sync modules (534, 535), the blade management module (140) sends to the baseboard management controllers (524, 525) an instruction to enable communication on the blade communication bus (202) between the blade management module (140) and baseboard management controller (524).

In the exemplary blade center (102) of FIG. 4, the reset sync modules (534, 535) detect a trigger edge, either rising or falling, of the pulsed gate signal and then send to their respective blade processor (156, 159) HyperTransport reset signals (542). The reset sync modules (534, 535) may send the HyperTransport signals (542) to their respective blade processor (156, 159) by setting the HyperTransport signals (542) to a logic 1 or logic 0 at the appropriate time in accordance with the type of reset to be initiated. Although only two HyperTransport signals (542), PWROK and RESET#, are depicted in FIG. 4, one of skill in the art will recognize that the number of HyperTransport reset signals sent from the reset sync modules (534, 535) to their respective blade processor (156, 159) may be as many or few as is necessary to implement each type of HyperTransport resets available to a particular HyperTransport technology processor.

Figure 5:
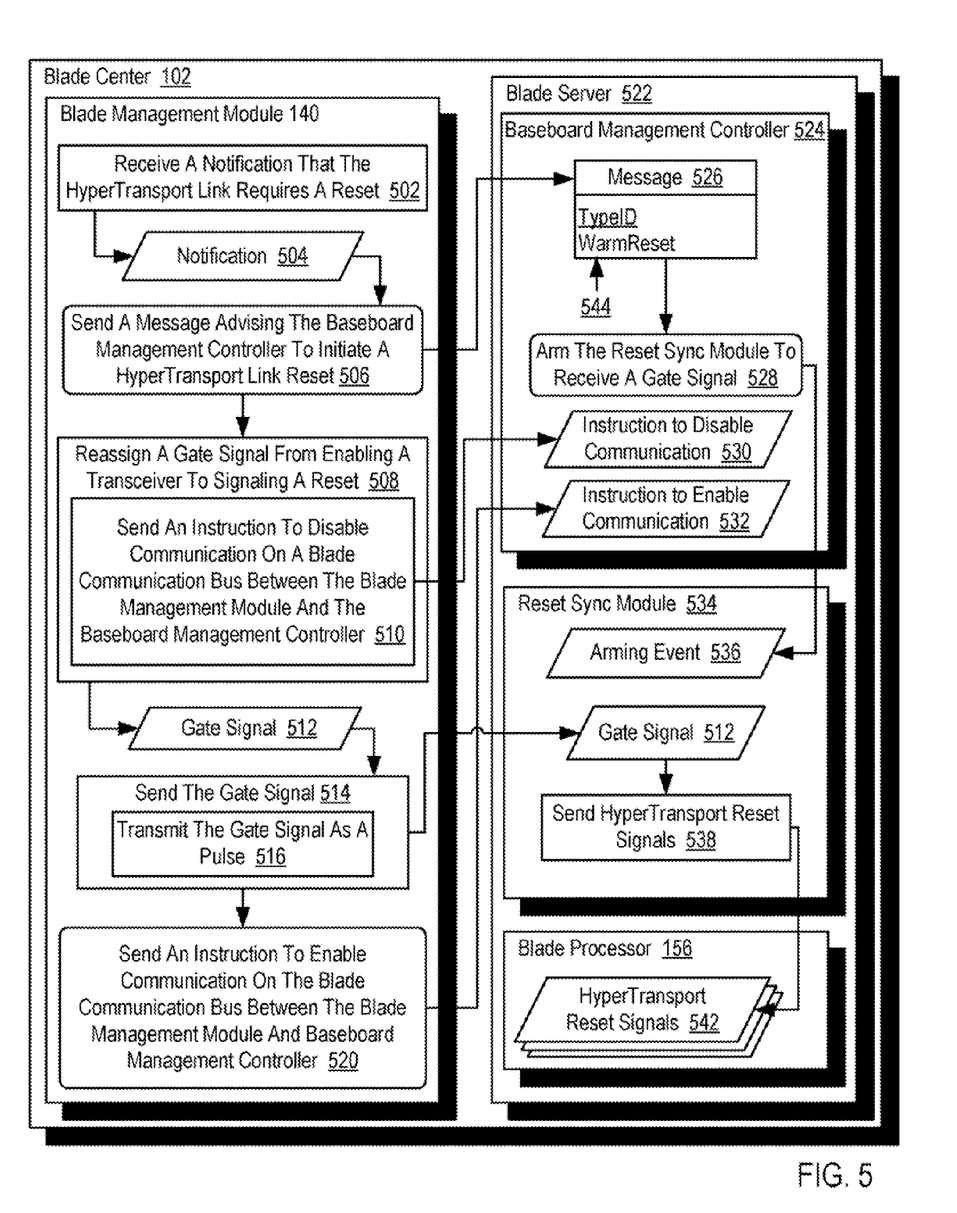
FIG. 5 sets forth a flow chart illustrating an exemplary method for resetting a HyperTransport link in a blade server according to embodiments of the present invention.

For further explanation, FIG. 5 sets forth a flow chart illustrating an exemplary method for resetting a HyperTransport link in a blade server according to embodiments of the present invention, where the HyperTransport link is a bidirectional, serial/parallel, high-bandwidth, low-latency, point to point data communications link. In the method of FIG. 5, the blade server (522) is installed in a blade center (102), and includes a blade processor (156), a reset sync module (534), and a baseboard management controller (524). The blade center (102) includes a blade management module (140) that is coupled to the baseboard management controller (524) by a blade communication bus.

The method of FIG. 5 includes receiving (502), by the blade management module (140), a notification (504) that the HyperTransport link requires a reset. Upon receiving the notification (504) that the HyperTransport link requires a reset, the blade management module sends (506), to the baseboard management controller (524), a message (526) advising the baseboard management controller (524) to initiate a HyperTransport link reset. In the method of FIG. 5, the message (526) advising the baseboard management controller (524) to initiate a HyperTransport link reset includes an identification (544) of a type of reset to be initiated. The identification (544) of a type of reset to be initiated in the exemplary message (526) of FIG. 5, indicates a warm reset is to be initiated. One of ordinary skill in the art will recognize that any type of reset can be identified in the message (526).

The method of FIG. 5 also includes arming (528), by the baseboard management controller (524) in response to the message (526), the reset sync module (534) to receive the gate signal (512). The baseboard management controller (524) may arm the reset sync module (534) by sending to the reset sync module an arming event. Consider, for example, a reset sync module (534) implemented as a state machine with three states, disarmed, armed, and reset. In the armed state, the reset sync module will treat the next signal it receives as a command to initiate a HyperTransport reset. The baseboard management controller may arm the reset sync module by sending an arming event that transitions the state machine into the armed state.

The method of FIG. 5 also includes reassigning (508), by the blade management module (140), a gate signal (512) from enabling a transceiver to signaling a HyperTransport link reset. The gate signal (512) is ordinarily used to enable a transceiver in a blade server. That is, the gate signal's normal duty is to enable the transceiver in the blade server, not to signal a HyperTransport link reset. The transceiver, when enabled, provides communication between the baseboard management controller and the blade management module through the blade communications bus. In the method of FIG. 5, reassigning (508) the gate signal (512) from enabling a transceiver to signaling a reset is carried out by sending (510), by the blade management module (140) to the baseboard management controller (524), an instruction (530) to disable communication on the blade communication bus between the blade management module (140) and the baseboard management controller (524). The gate signal (512), when presented on the out-of-band bus to the reset sync module, will still gate the transceiver, but such gating of the transceiver will have no effect on the communications through the blade communications bus because the baseboard management controller will be sending no signals through the transceiver.

The method of FIG. 5 also includes sending (514), by the blade management module (140) to the reset sync module (534) on an out-of-band bus, the gate signal (512). In the method of FIG. 5, sending (514) the gate signal (512) is carried out by transmitting (516), by the blade management module (140), the gate signal (512) as a pulse. That is, the blade management module (140) inverts the gates signal (512) and then reverts the gate signal (512) on the out-of-band bus. At a time after sending (514) the gate signal (512), the blade management module (140) sends (520), to the baseboard management controller (524), an instruction (532) to enable communication on the blade communication bus between the blade management module (140) and baseboard management controller (524).

The method of FIG. 5 also includes sending (538), by the reset sync module (534) to the blade processor (156) in response to the gate signal (512), HyperTransport reset signals (542). The reset sync module (534) may send the HyperTransport signals (542) to the blade processor (156) by setting the HyperTransport signals (542) to a logic 1 or logic 0 at the appropriate time in accordance with the type of reset to be initiated.

Exemplary embodiments of the present invention are described largely in the context of a fully functional blade center configure for resetting a HyperTransport link in a blade server. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of resetting a HyperTransport link in a blade server, the blade server comprising a blade processor, a reset sync module, and a baseboard management controller, the blade server installed in a blade center, the blade center comprising a blade management module, the blade management module coupled to the baseboard management controller by a blade communication bus, the HyperTransport link comprising a bidirectional, serial/parallel, high-bandwidth, low-latency, point to point data communications link, the method comprising:

reassigning, by the blade management module, a gate signal from enabling a transceiver to signaling a HyperTransport link reset;

sending, by the blade management module to the reset sync module on an out-of-band bus, the gate signal; and in response to the gate signal, sending, by the reset sync module to the blade processor, HyperTransport reset signals.

2. The method of claim 1 further comprising:

receiving, by the blade management module, a notification that the HyperTransport link requires a reset;

sending, by the blade management module to the baseboard management controller, a message advising the baseboard management controller to initiate a HyperTransport link reset; and responsive to the message, arming, by the baseboard management controller, the reset sync module to receive the gate signal.

3. The method of claim 2 wherein the message advising the baseboard management controller to initiate a HyperTransport link reset comprises an identification of a type of reset to be initiated.

4. The method of claim 1 wherein reassigning a gate signal from enabling a transceiver to signaling a reset further comprises sending, by the blade management module to the baseboard management controller, an instruction to disable communication on the blade communication bus between the blade management module and the baseboard management controller.

5. The method of claim 4 further comprising, at a time after sending the gate signal, sending, by the blade management module to the baseboard management controller an instruction to enable communication on the blade communication bus between the blade management module and baseboard management controller.

6. The method of claim 1 wherein sending, by the blade management module to the reset sync module on an out-of-band bus, the gate signal further comprises transmitting, by the blade management module, the gate signal as a pulse.

7. Apparatus for resetting a HyperTransport link in a blade server, the blade server comprising a blade processor, a reset sync module, and a baseboard management controller, the blade server installed in a blade center, the blade center comprising a blade management module, the blade management module coupled to the baseboard management controller by a blade communication bus, the HyperTransport link comprising a bidirectional, serial/parallel, high-bandwidth, low-latency, point to point data communications link,
the apparatus comprising a computer processor, a computer memory operatively coupled to the computer processor, the computer memory having disposed within it computer program instructions capable of:
reassigning, by the blade management module, a gate signal from enabling a transceiver to signaling a HyperTransport link reset;
sending, by the blade management module to the reset sync module on an out-of-band bus, the gate signal; and
in response to the gate signal, sending, by the reset sync module to the blade processor, HyperTransport reset signals.

8. The apparatus of claim 7 further comprising computer program instructions capable of:
receiving, by the blade management module, a notification that the HyperTransport link requires a reset;
sending, by the blade management module to the baseboard management controller, a message advising the baseboard management controller to initiate a HyperTransport link reset; and
responsive to the message, arming, by the baseboard management controller, the reset sync module to receive the gate signal.

9. The apparatus of claim 8 wherein the message advising the baseboard management controller to initiate a HyperTransport link reset comprises an identification of a type of reset to be initiated.

10. The apparatus of claim 7 wherein reassigning a gate signal from enabling a transceiver to signaling a reset further comprises sending, by the blade management module to the baseboard management controller, an instruction to disable communication on the blade communication bus between the blade management module and the baseboard management controller.

11. The apparatus of claim 10 further comprising computer program instructions capable of, at a time after sending the gate signal, sending, by the blade management module to the baseboard management controller an instruction to enable communication on the blade communication bus between the blade management module and baseboard management controller.

12. The apparatus of claim 7 wherein sending, by the blade management module to the reset sync module on an out-of-band bus, the gate signal further comprises transmitting, by the blade management module, the gate signal as a pulse.

13. A computer program product for resetting a HyperTransport link in a blade server, the blade server comprising a blade processor, a reset sync module, and a baseboard management controller, the blade server installed in a blade center, the blade center comprising a blade management module, the blade management module coupled to the baseboard management controller by a blade communication bus, the HyperTransport link comprising a bidirectional, serial/parallel, high-bandwidth, low-latency, point to point data communications link,
the computer program product disposed upon a non-transmission, recordable storage medium, the computer program product comprising computer program instructions capable of:
reassigning, by the blade management module, a gate signal from enabling a transceiver to signaling a HyperTransport link reset;
sending, by the blade management module to the reset sync module on an out-of-band bus, the gate signal; and
in response to the gate signal, sending, by the reset sync module to the blade processor, HyperTransport reset signals.

14. The computer program product of claim 13 further comprising computer program instructions capable of:
receiving, by the blade management module, a notification that the HyperTransport link requires a reset;
sending, by the blade management module to the baseboard management controller, a message advising the baseboard management controller to initiate a HyperTransport link reset; and
responsive to the message, arming, by the baseboard management controller, the reset sync module to receive the gate signal.

15. The computer program product of claim 14 wherein the message advising the baseboard management controller to initiate a HyperTransport link reset comprises an identification of a type of reset to be initiated.

16. The computer program product of claim 13 wherein reassigning a gate signal from enabling a transceiver to signaling a reset further comprises sending, by the blade management module to the baseboard management controller, an instruction to disable communication on the blade communication bus between the blade management module and the baseboard management controller.

17. The computer program product of claim 16 further comprising computer program instructions capable of, at a time after sending the gate signal, sending, by the blade management module to the baseboard management controller an instruction to enable communication on the blade communication bus between the blade management module and baseboard management controller.

18. The computer program product of claim 13 wherein sending, by the blade management module to the reset sync module on an out-of-band bus, the gate signal further comprises transmitting, by the blade management module, the gate signal as a pulse.

* * * * *